US011935034B2

(12) United States Patent
Gupta

(10) Patent No.: US 11,935,034 B2
(45) Date of Patent: Mar. 19, 2024

(54) INTEGRATED SCAN MONEY TRANSFER TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 142 days.

(21) Appl. No.: 17/744,867

(22) Filed: May 16, 2022

(65) Prior Publication Data

US 2022/0374867 A1 Nov. 24, 2022

Related U.S. Application Data

(63) Continuation of application No. 17/325,392, filed on May 20, 2021, now Pat. No. 11,392,934.

(51) Int. Cl.
*G06Q 20/34* (2012.01)
*G06Q 20/32* (2012.01)
*G06Q 20/40* (2012.01)

(52) U.S. Cl.
CPC ......... *G06Q 20/353* (2013.01); *G06Q 20/321* (2020.05); *G06Q 20/326* (2020.05); *G06Q 20/401* (2013.01)

(58) Field of Classification Search
None
See application file for complete search history.

(56) References Cited

U.S. PATENT DOCUMENTS

2019/0370805 A1\* 12/2019 Van Os ................. H04W 12/06
2020/0387887 A1\* 12/2020 Rathod ............. G06Q 20/3224

OTHER PUBLICATIONS

David Nield, "All The Ways You Can Pay With A Phone Or Smartwatch," https://www.wired.com/story/how-to-pay-with-phone-smartwatch/, Oct. 13, 2020.

\* cited by examiner

*Primary Examiner* — David P Sharvin
(74) *Attorney, Agent, or Firm* — Weiss & Arons LLP

(57) ABSTRACT

A smartwatch device that operates as an ad hoc card reader is provided. The smartwatch device may include hardware and software. The smartwatch device may scan multiple cards. The smartwatch device may capture card data elements from each card. The smartwatch device may receive a transaction amount for each card. The smartwatch device may communicate with a financial institution associated with each card. Each financial institution may transmit an approval request to a device associated with the card. Each device may receive a request to approve the transaction. Each device may approve the request, and the approval may be transmitted to the financial institution. Each financial institution may transmit an approval notification to the smartwatch. Upon receipt of an approval notification for each card, the smartwatch may transmit the captured card data elements and the transaction amount for each card and payee data to a processing entity for transaction processing.

11 Claims, 6 Drawing Sheets

INTEGRATED SCAN MONEY TRANSFER TECHNOLOGY

CROSS-REFERENCE TO RELATED APPLICATION

This application is a continuation of U.S. patent application Ser. No. 17/325,392, filed on May 20, 2021, now U.S. Pat. No. 11,392,934, and entitled "INTEGRATED SCAN MONEY TRANSFER TECHNOLOGY" which is hereby incorporated by reference herein in its entirety.

FIELD OF TECHNOLOGY

Aspects of the disclosure relate to smartwatches. Specifically, this disclosure relates to smartwatch communications.

BACKGROUND OF THE DISCLOSURE

Smartwatches have become more common in recent years. For the purposes of the disclosure, smartwatches may be understood to mean wearable watches that include one or more internal processors.

Smartwatches are compact devices and usually stay with the user. Therefore, smartwatches are easily accessible. Because of the ease of access associated with smartwatches, it would be desirable for a smartwatch to communicate with one or more payment devices, such as a payment card. A payment card may be a debit card, a credit card, an automated teller machine ("ATM") card or any other suitable card.

It would be yet further desirable for the smartwatch to act as a liaison between the payment card(s) and the financial institution.

It would be further desirable for such communication to obviate the need for associated mobile devices, desktop computers, laptop computers, card devices or any other devices.

It would be yet further desirable for the communications between the smartwatch and the financial institution to include payment instructions and/or payment data.

It would be yet further desirable for the smartwatch to operate as a card reader.

It would be yet further desirable for the communication between the smartwatch and the one or more payment cards to enable a first smartwatch to gather funds from multiple accounts associated with the payment cards, and to initiate a transfer of funds instruction.

It would be yet further desirable for the benefactor of the transfer of funds instruction to be the multiple accounts associated with the payment cards.

It would be still further desirable for the beneficiary of the transfer of funds instruction to be a third-party account.

SUMMARY OF THE DISCLOSURE

Apparatus and methods for smartwatch-based multi-card transactions are provided. For the purposes of this application, smartwatches are wearable devices that are typically worn on a wrist. Smartwatches may include one or more processors. Smartwatches may execute various applications.

Exemplary smartwatch components may include standard watch components such as a strap, a casing and a face.

Exemplary smartwatch components specific to a smartwatch may include a micro control unit ("MCU"), a central processing unit ("CPU"), a graphical processing unit ("GPU"), one or more faces including one or more screens, one or more sensors, a Bluetooth chipset, a haptic feedback unit, a global positioning system ("GPS") receiver, a loudspeaker, a microphone, a printed circuit board ("PCB"), a power management unit, read only memory ("ROM"), random access memory ("RAM"), a touch screen controller, a waterproof seal, a universal serial bus ("USB") controller, charging connectors, a radio receiver (Wi-Fi), a digital signal processor, a near-field communication ("NFC") component, a micro-electro-mechanical system ("MEMS") and a camera.

Exemplary MCUs may control sensors and processors included in the smartwatch.

Exemplary CPUs may execute the main processing on the smartwatch. Many smartwatch CPUs are licensed advanced reduced instruction set computing (RISC) machines ("arm")® processors.

Exemplary GPUs may be processors that are used to reduce the workload on the CPU when rendering and generating the graphics on the smartwatch. The GPU may be a specialized circuit designed to rapidly manipulate and alter memory to accelerate the creation of images.

Exemplary smartwatch faces range from 30-60 mm long by 30-60 mm wide. Exemplary smartwatch screens may include a depth of approximately 5 mm to 20 mm. Exemplary smartwatch screens may have capacitive touch screens. Exemplary smartwatch screens can be made of various materials, such as traditional liquid crystal display ("LCD"), sharp memory LCD, in-plane switching ("IPS") LCD with higher pixel density, electronic-ink ("E-ink"), organic light emitting diode ("OLED"), OLED with higher pixel density and interferometric modulator display technology (also referred to as Mirasol® display technology).

The display may be laminated onto polished sapphire crystal or other suitable substances. The sapphire crystal may be synthetic sapphire crystal. The display may be laminated onto ion x glass. It should be appreciated that ion x glass may be more flexible than sapphire crystal.

Exemplary sensors may include three categories of sensors. A first category may include motion sensors. Motion sensors may include accelerator, gyroscope, geomagnetic sensor, atmospheric pressure sensor and any other suitable motion sensors. A second category of sensors may include biosensors. Biosensors may include any suitable biosensors. A third category of the sensors may include environmental sensors. Environmental sensors may include humidity sensor, gas sensor, pH sensor, UV sensor, ambient light sensor, dust particles sensor, pressure sensor, microphone sensor, compass sensor and any other suitable environmental sensors. These sensors may collect data and then transfer the data to an internal watch processor, such as the CPU or the display processor.

An exemplary smartwatch battery may include Lithium ion ("Li-ion") or Lithium polymer batteries. Lithium Polymer batteries have a higher power capacity than Li-ion batteries and therefore may be a preferred choice for smartwatches.

An exemplary Bluetooth® chipset may include Bluetooth® and Bluetooth Low Energy® ("BLE") chips. These Bluetooth® chips may be board level components that broadcast in the 2.4 GHz radio band. Bluetooth® technology may facilitate short-range cable protocols and networking. There may be several types of Bluetooth® chips. The Bluetooth® chips may include Bluetooth® baseband controllers, Bluetooth® radio frequency transceivers, single chip solutions, Bluetooth® modules and Bluetooth® cores. Bluetooth® baseband controllers may combine a protocol stack, a link controller, a link manager and host interface firmware of the Bluetooth® specification in a single integrated circuit. Bluetooth® radio frequency transceivers are transmitters/receivers that operate in the 2.4 GHz range and comply with Bluetooth® Special Interest Group ("SIG") requirements. Single chip solutions are Bluetooth®-compliant integrated circuits that incorporate both baseband controllers and radio frequency ("RF") transceivers. Bluetooth® modules are self-contained components. Bluetooth® cores are intellectual property cores that can be loaded into field-programmable gate arrays or application specific integrated circuits.

An exemplary haptic feedback unit may provide tactile sensors to a user. Examples of haptic feedback may include vibrotactile, electrotactile, ultrasound and thermal feedback.

An exemplary GPS receiver may be capable of receiving information from GPS satellites. As such, GPS receivers may be able to determine the position of the smartwatch based on the information received from the GPS satellites.

An exemplary loudspeaker is an electroacoustic transducer. A loudspeaker is a device that converts an electrical audio signal into a corresponding sound. The loudspeaker may provide audio capabilities to the smartwatch. The loudspeaker may enable a user to conduct a telephone conversation via the smartwatch.

An exemplary microphone is a transducer that converts sound into an electrical signal. The electrical signal can be amplified, transmitted or recorded. The microphone may be used to accept voice input from a user of the smartwatch. The microphone may enable a user to conduct a telephone conversation via the smartwatch.

An exemplary printed circuit board ("PCB") mechanically supports and electrically connects electrical or electronic components using conductive tracks, pads and other features. The conductive tracks, pads and other features may be etched from one or more sheet layers of copper. The sheet layers of copper may be laminated onto a non-conductive substate. The sheet layers of copper may be laminated between sheet layers of a non-conductive substrate.

An exemplary power management unit may be a microcontroller that governs power functions of the smartwatch. As such, the power management unit may control the battery function.

Exemplary read-only memory ("ROM") may be a type of non-volatile memory that can be read at high speed but is not capable of being changed by program instructions.

Exemplary random-access memory ("RAM") may include memory that can be written to, and read from, in any order.

An exemplary touch screen controller is a controller that detects positional contact pressure on a visual display surface. One or more fingers may be used as pointing devices. The touch screen controllers may interface between the CPU or MCU and the touchscreen element, such as the display.

An exemplary waterproof seal may surround the electrical components inside the smartwatch. The waterproof seal may provide waterproof qualities to the smartwatch.

An exemplary universal serial bus ("USB") controller is a controller that controls the input of a USB device and/or cable. In some instances, when a USB cable is used to charge the smartwatch, the connection between the USB controller and the USB cable may be a magnetic connection. The magnetic connection may appear to lack the typical USB port. This magnetic connection may avoid the space required when using a typical standard USB port, mini-USB port or micro-USB port. This magnetic connection may also enable the waterproof compartment inside the smartwatch to maintain its waterproof capabilities.

Exemplary charging connectors may include the USB controller described above. Exemplary charging connectors may include any other suitable charging connectors.

An exemplary radio receiver may be a receiver capable of receiving radio waves. These radio waves may provide Wi-Fi and internet capabilities to the smartwatch.

An exemplary digital signal processor is a microprocessor chip with architecture augmented for the operational needs of digital signal processing.

An exemplary NFC component may provide NFC capabilities to the smartwatch. As such, the NFC component may enable the smartwatch to communicate with other smartwatches using NFC.

An exemplary MEMS may be a system that includes technology of microscopic devices. The system may include moving parts. In addition to micro-electro-mechanical components, system parts may also be rated on the nanoscale. As such, the system may include nano-electro-mechanical parts and nano-electro-mechanical technology. Because a relatively large amount of computation is performed within a relatively small region, various smartwatch components and processors may be made of, and/or include, MEMS components.

An exemplary smartwatch camera may capture photographs and/or videos.

One or more software modules may execute on the aforementioned processors. The one or more software modules may be stored in one or more memory locations located within the aforementioned memory included in the smartwatch. The one or more software modules may, in the alternative, be referred to as applications. The applications may enable the smartwatch to execute various tasks.

Methods and systems for smartwatch-based, multi-card transactions are provided. The transactions may be payment-card-based transactions.

A smartwatch may scan one or more cards. The cards may be payment cards. The payment cards may include debit cards, credit cards, ATM cards or other suitable cards. The payment cards may or may not include electronic chips, such as an EMV chip (named after the companies Europay®, Mastercard® and Visa®).

Scanning one or more cards may initiate a transaction. A smartwatch camera or group of cameras may operate as a scanner. Any other suitable scanning component may also operate as a scanner. Examples of other scanning components may include a magnetic card reader and an electronic EMV chip reader. The scanning component may generate a card scan. The card scan may include a photograph of the card. The card scan may include a photograph of the face of the card. The card scan may include a photograph of the underside of the card.

The smartwatch microprocessor may execute a software application that identifies and retrieves card data elements from each card scan. Such an application may be referred to as a card data identification component.

In some embodiments, the scanning component and the card data identification component may execute concurrently. As such, the scanning component may scan the card data elements without maintaining a card scan.

The card data identification component may retrieve a plurality of card data elements for each of the scanned cards. Card data elements may include a card number, a card holder name, an expiration date, a card verification value ("CVV") code and any other suitable card data elements.

The card data elements may also include identification of an entity. The entity may be an external entity, such as a financial institution, associated with the card. The financial institution may also be referred to as the card issuer.

The card data elements may also include identification of a device. The device may be an external device associated with the card. Examples of a device may include a mobile device, a smartwatch device, a smartglasses device, any other suitable digital wearable device, a computer or any other suitable device. The card holder may have pre-selected and/or pre-registered the device in order to receive notifications from the entity.

For each scanned card, the smartwatch may communicate the card data elements to the entity associated with the scanned card. In an example, a smartwatch scanned cards A, B and C. Card A may include set of card data elements A. Set of card data elements A may identify external entity X. Card B may include set of card data elements B. Set of card data elements B may identify external entity Y. Card C may include set of card data elements C. Set of card data elements C may identify external entity Z. As such, the smartwatch may communicate card data elements A to external entity X. The smartwatch may also communicate card data elements B to external entity Y. The smartwatch may also communicate card data elements C to external entity Z.

In response to communicating the set of card data elements, each of the external entities may identify an account number that corresponds to the set of card data elements. Each external entity may transmit the identified account number to the smartwatch.

The smartwatch may receive the identified account number for each set of card data elements. The smartwatch may link the received account number to the corresponding set of card data elements.

The smartwatch may receive a transaction amount for each of the plurality of cards. The transaction amount may be received as user input on the smartwatch. The user input may be received at a touch screen on the smartwatch. The user input may also include any suitable combination of, or pattern of, tapping, squeezing, swiping and any other suitable touch-based input. The user input may include selecting buttons on a touch screen of the smartwatch.

The transaction amount may or may not be equivalent for each set of card data elements. As such, if the transaction amount is equivalent for each set of card data elements, the transaction amount may be inputted once into the smartwatch. If the transaction amount is different for each set of card data elements, a transaction amount may be inputted by the user for each set of card data elements.

The smartwatch may link the received transaction amount directly to the account number. As such, the transaction amount may be linked to the corresponding account number which may be linked to the corresponding set of card data elements.

The smartwatch may aggregate the transaction amounts linked to the account numbers into an aggregated transaction payload. It should be appreciated that the set of card data elements may or may not be included in the aggregated transaction payload.

The smartwatch may transmit the aggregated transaction payload to a processing entity. The processing entity may transmit an approval request to each device identified within each set of card data elements. In some embodiments, the processing entity may transmit the approval request to each device via the financial institution identified within each set of card data elements. The approval request may include the transaction amount. The approval request may include identifying data relating to the smartwatch. Such identifying data may include a name associated with the smartwatch, an alias name associated with the smartwatch, geographical information relating to the smartwatch and any other suitable data.

The approval request may also include identifying information relating to the smartwatch that initiated the transaction. The approval request may also include identifying information relating to the transaction itself. Examples of identifying information may include a name, and/or alias name, associated with the smartwatch. Examples of identifying information may also include geolocation data associated with the smartwatch. Examples of identifying information may also include an internet protocol ("IP") address associated with the smartwatch.

The approval request may also include identification data relating to a payee of the transaction. For example, the approval request may include a payee name, payee alias name, payee account number, payee financial institution, payee telephone number, payee e-mail address and any other suitable payee information. The payee identification data may be received at a user interface of the smartwatch. Such a user interface may be a touch screen. The payee identification data may be retrieved from a location internal to the smartwatch. Such a location may be a memory location. The payee identification data may be received from a location external to the smartwatch. Such a location may be a merchant point-of-sale device.

In some embodiments, the smartwatch's user may be associated with the payee account. As such, the payee identification data may be an account associated with the smartwatch device. In such embodiments, the payee identification data may be retrieved from a storage location internal to the smartwatch device.

The processing entity may receive an approval from each device that received an approval request. Upon receipt of the approval from each device, the processing entity may process the aggregated transaction payload.

Upon processing the aggregated transaction payload, the processing entity may transmit a notification to each device that received an approval request. The processing entity may also transmit a notification to the smartwatch. The notification may include details relating to the processed transaction.

In some embodiments, the transaction amount may be received at the smartwatch prior to the smartwatch communicating with the external entities. As such, in addition to communicating the set of card data elements to the external entities, the smartwatch may also communicate a transaction amount to the external entities.

In such embodiments, the approval request transmitted from each external entity to the device identified within the card data elements may include the transaction amount. Therefore, the approval received at each device may include approving the transaction amount.

In response to receiving an approval from the device, each external entity may transmit the approval to the smartwatch. In some embodiments, the account number may be transmitted separately from the approval. In other embodiments, the account number may be transmitted together with the approval. In yet other embodiments, the account number may be transmitted without the approval. In still other embodiments, the approval may be transmitted without the account number.

In embodiments where the approval is transmitted without the account number, in order for the processing entity to process the transaction, the aggregated transaction payload may include at least a portion of the card data elements linked to the transaction amount.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
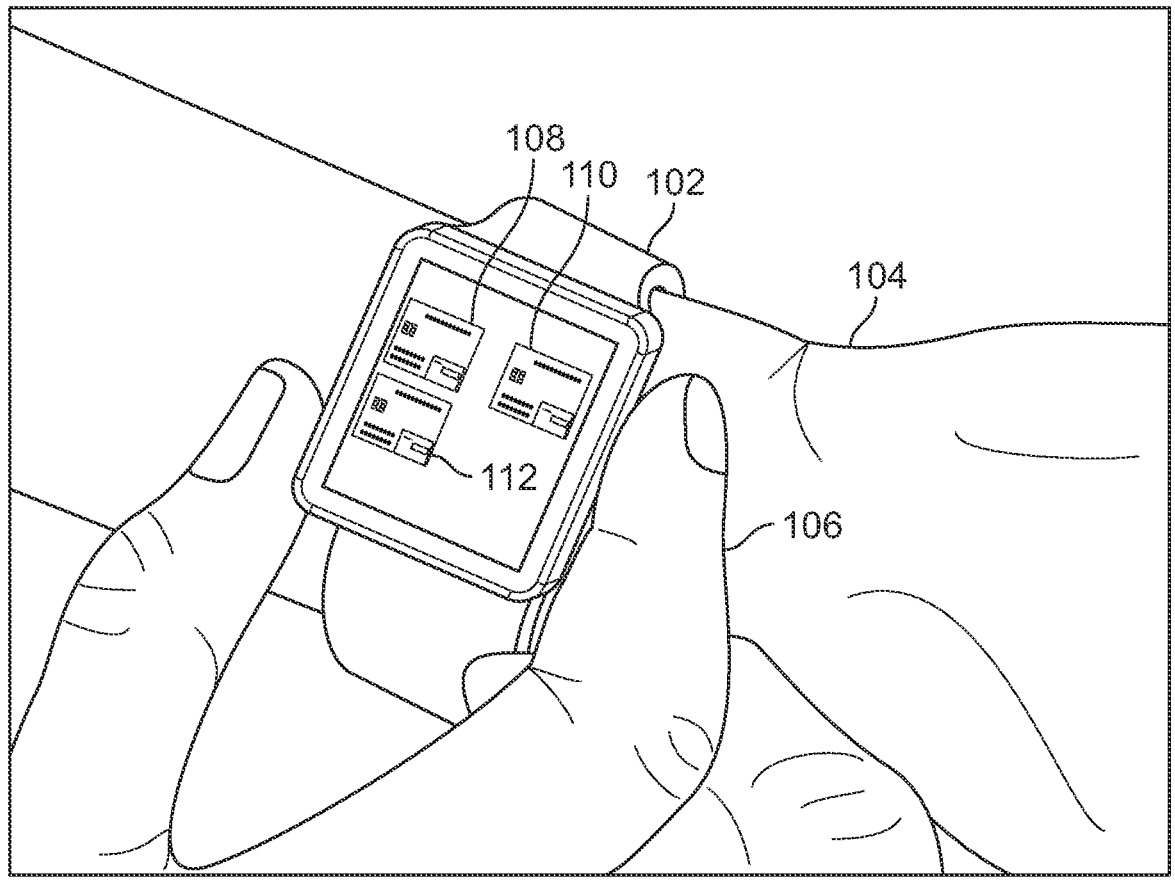
FIG. 1 shows an illustrative diagram in accordance with principles of the disclosure.

Apparatus and methods for smartwatch devices that operate multi-card transactions are provided.

A smartwatch may include a plurality of hardware components and software components, such as those described in detail in the summary of the disclosure. The hardware components may include a watch face and a band. The watch face may rest on a user's wrist. The band may wrap around the user's wrist and secure the watch face relative to the user's wrist.

The hardware components may also include one or more microprocessors. At least one of the microprocessors may be operable to initiate a transaction.

The hardware components may also include one or more displays. The microprocessor may instruct the display regarding the software displays. At least one of the displays may display software displays. At least one of the displays may be a nano light emitting diode ("LED") touch screen.

The nano touch screen may be a nano organic light emitting diode ("OLED") touch screen. The nano OLED touch screen may be constructed using OLED technology.

OLED technology may enhance functionality of a smart-glasses display. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a liquid crystal display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual power to provide enhanced security and functionality. Illustrative devices that may be constructed using OLED technology are disclosed in commonly assigned U.S. Pat. No. 9,665,818, which is hereby incorporated by reference herein in its entirety.

In some embodiments, the nano touch screen may be constructed, using liquid metal printing, from atomically-thin indium-tin oxide ("ITO"). During construction, an indium-tin alloy is heated to 200 degrees Celsius. At 200 degrees Celsius, the indium-tin alloy becomes a liquid. The liquid is then rolled over a surface to print nano-thin sheets of ITO. These nano sheets are two-dimensional and have the same chemical make-up as standard ITO. However, these nano sheets have a different crystal structure than standard ITO. The new crystal structure gives the nano sheets new mechanical and optical properties.

One new property may include the full flexibility of the ITO sheets. These ITO sheets also absorb approximately 0.7% of light, which is lower than standard conductive glass that absorbs 5-10% of light. These ITO sheets may also be transparent. As such, these nano ITO sheets provide fully flexible, conductive and transparent material. Therefore, such atomically-thin ITO sheets may be used to produce nano touch screens for inclusion in smartwatches.

The nano LED touch screen may receive user input. The user input may be touch-based user input, such as touch gestures. Touch gestures may include swiping, tapping, squeezing and any other suitable touch gestures. Touch gestures may also include a pattern of any of the above-mentioned gestures.

The hardware components may also include a scanner. The scanner may include a camera. The scanner may include a magnetic scanning device. The scanner may include any other suitable data-capturing hardware or software. The scanner may capture a plurality of card photographs. The plurality of card photographs may relate to a plurality of payment cards.

The hardware components may also include a nano wireless network interface card ("NIC"). The nano wireless NIC may establish communication with a wireless network.

The hardware components may also include a battery. The battery may power the display, such as the nano LED touch screen, the microprocessor, the scanner and the nano wireless NIC.

The smartwatch may also include a plurality of software components.

The plurality of software components may include a card data identification module. The card data identification module may identify a set of card data elements from each captured card photograph. Each set of card data elements may relate to a card included the plurality of cards.

The plurality of software components may include an information controller module. The information controller module may capture a transaction amount for each of the plurality of payment cards. The information controller module may communicate with the nano LED touch screen to capture the transaction amounts. In some embodiments, a touch screen module may interface between the nano LED touch screen and the information controller module.

The plurality of software components may also include a card data aggregation and validation module. The card data aggregation and validation module may link the captured transaction amount to the set of card data elements for each card.

The card data aggregation and validation module may also transmit the set of card data elements to an external card entity associated with the card. The external card entity may be identified within each set of card data elements.

The card data aggregation and validation module may also receive an approval signal from each external card entity. The approval signal may be an indication of approval of the transaction. Upon receipt of the approval signal from each external card entity, the card aggregation and validation module may aggregate each set of card data elements linked to the transaction amount into an aggregated transaction payload.

In some embodiments, prior to receiving the approval signal, the external card entity may request and receive approval from a device identified within the card data elements. The device may be a second smartwatch, a mobile device, a smartglasses or any other suitable device.

The plurality of software components may also include a payee data identification module. The payee data identification module may identify a plurality of payee data elements. The payee data identification module may be instantiated prior to, or upon conclusion of, the card data aggregation and validation module.

The plurality of software components may also include a wireless controller module. The wireless controller module may interface between the nano wireless network interface card and an external Wi-Fi device. The wireless controller module may provide wireless connectivity to the smartwatch device.

The plurality of software components may include a payment interface. The payment interface may receive wireless connectivity via the wireless controller module. The payment interface may receive processing capabilities from the microprocessor. The payment interface may receive the aggregated transaction payload. The payment interface may receive the payee data elements. The payment interface may append the payee data elements to the aggregated transaction payload. The payment interface may transmit the aggregated transaction payload to an external entity. The payment interface may receive a confirmation from the external entity.

In some embodiments, the payment interface may receive one or more payee data elements. In such embodiments, the payment interface may transmit the received aggregated transaction payload and the one or more payee data elements to the external entity. The external entity may be a processing entity.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. Smartwatch 102 may be worn on hand 104. Hand 106 may be able to tap, touch and/or otherwise interact with smartwatch 102.

Smartwatch 102 may include multiple components, such as those described in the summary of the disclosure. These components may enable smartwatch to execute various functionalities. Such functionalities may include displaying data, photographing objects, playing audio files, playing audio visual files, capturing card data and any other suitable functionality.

Smartwatch 102 may photograph, or otherwise capture card data from one or more cards, such as payment cards. Smartwatch 102 may have captured a photograph of cards A, B and C. Thumbnails of the photographed cards may appear on the display of smartwatch 102, as shown at 108, 110 and 112. Card A may be displayed as a thumbnail, as shown at 108. Card B may be displayed as a thumbnail, as shown at 110. Card C may be displayed as a thumbnail, as shown at 112.

At times, the cards may be photographed in sequence—i.e., one photograph of card A, a second photograph of card B and a third photograph of card C. An application may combine the photographs and display all of the photographs on a single display. Other times, the cards may be photographed together—i.e., a single photograph may capture card A, card B and card C. It should be appreciated that, at times, both the front and the back of the card may be photographed. At other times, either the front or the back of the card may be photographed.

In certain embodiments, smartwatch 102 may not capture and store photographs of the cards. Rather, the card data may be scanned off of the cards using a camera, magnetic reader, EMV chip reader or other suitable technology. As such, instead of photographs being displayed on smartwatch 102, data thumbnails may be displayed on smartwatch 102. The data thumbnails may include card data, such as a card holder name, a card number or a portion thereof, a card expiration date, a card issuer name, a CVV and/or any other suitable data.

Figure 2:
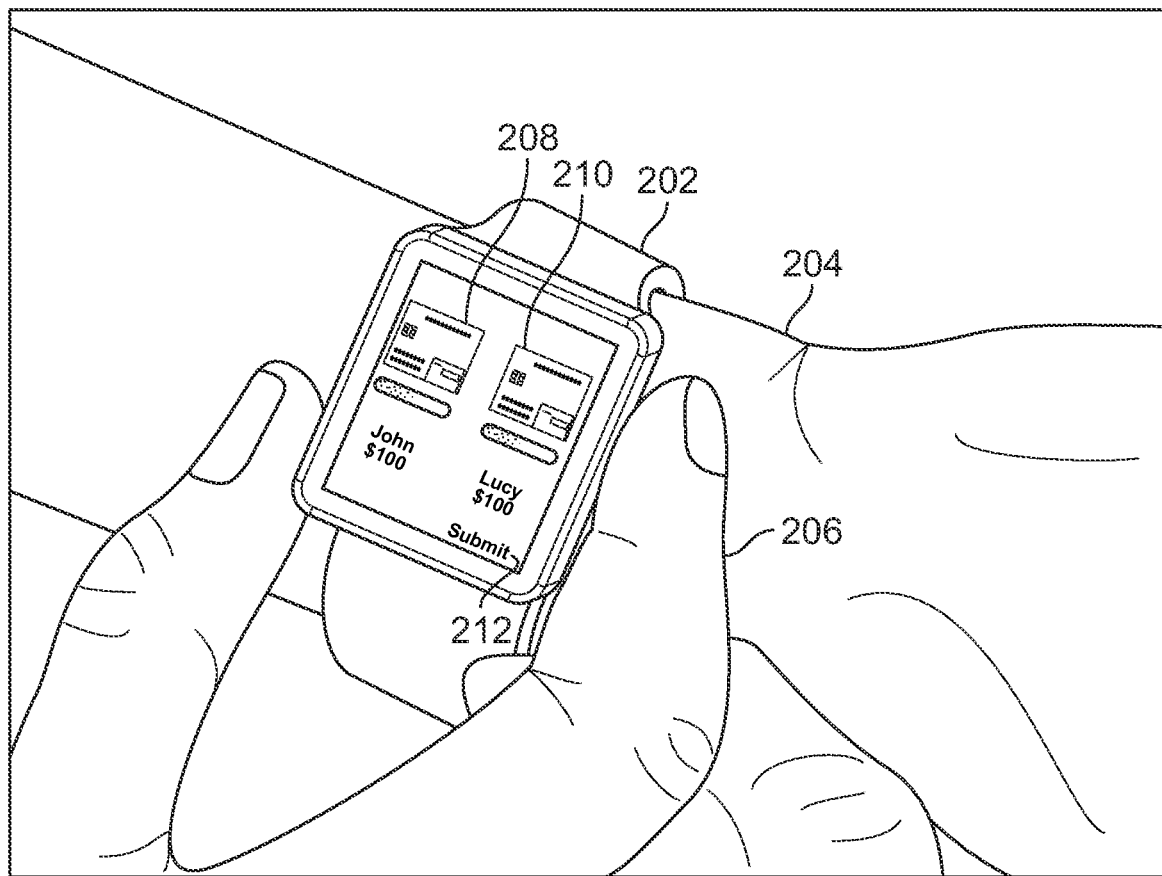
FIG. 2 shows another illustrative diagram in accordance with principles of the disclosure.

FIG. 2 shows another illustrative diagram. The illustrative diagram shows smartwatch 202 worn on hand 204. Hand 206 may interact with smartwatch 202. Smartwatch 202 may include a display. The display may display card thumbnails 208 and 210. Card thumbnails 208 and 210 may show a thumbnail of a captured card.

Card data and transaction amounts may be shown adjacent to thumbnails 208 and/or 210. As such, the first name of the card holder, identified by thumbnail 208, may be John, as shown beneath thumbnail 208. Also, the transaction amount to be charged to the card identified by thumbnail 208 may be $100.00, as shown beneath thumbnail 208.

The first name of the card holder, identified by thumbnail 210, may be Lucy, as shown beneath thumbnail 210. Also, the transaction amount to be charged to the card identified by thumbnail 210 may be $100.00, as shown beneath thumbnail 210.

It should be appreciated that the transaction amount may be entered by a user, using an entry field on a touch screen of 202. The transaction amount may be entered using any other suitable entry method, such as, for example, text-to-voice entry.

Once a user completed capturing all of the card data for a specific transaction and a transaction amount for each captured card, the user may select submit button 212. Selection of submit button 212 may trigger the transmission of the card data and the transaction amount to a financial institution. It should be appreciated that each set of card data and transaction amount may be transmitted to the financial institution associated with the card. Such a financial institution may also be referred to as a card issuer.

Figure 3:
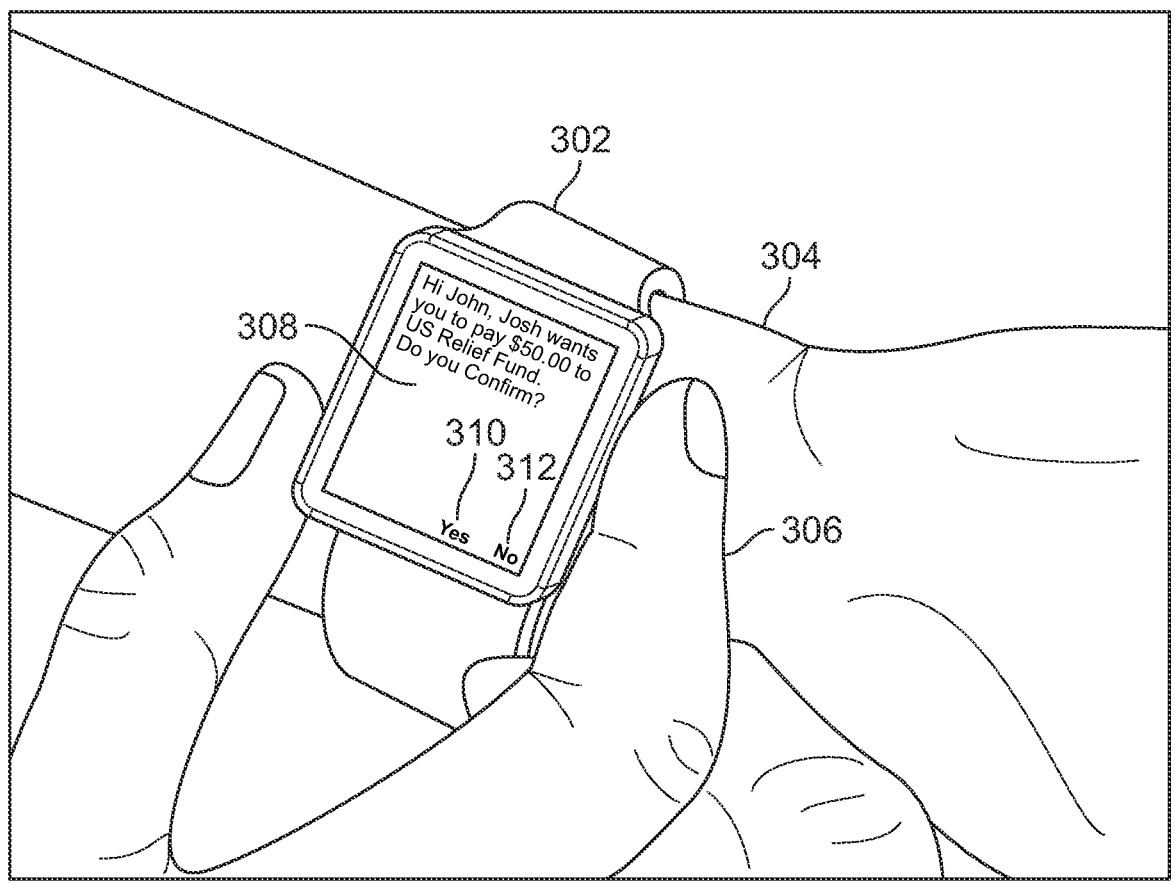
FIG. 3 shows yet another illustrative diagram in accordance with principles of the disclosure.

FIG. 3 shows another illustrative diagram. The illustrative diagram shows smartwatch 302 worn on hand 304. Hand 306 may interact with smartwatch 302. Smartwatch 302 may include a display.

It should be appreciated that smartwatch 302 may not be the smartwatch that initiated a transaction. Rather, smartwatch 302 may be associated with a card that was captured for a transaction on another smartwatch. Once the user of the initiating smartwatch selects the submit button, and the transaction data is transmitted to one or more financial institutions. The financial institutions that receive the transaction data may then request approval from a device associated with the card holder. Such a device may be a smartwatch. Such a device may be smartwatch 302, as shown in FIG. 3.

Smartwatch 302 may display data relating to the transaction. As shown at 308, smartwatch 302 may display "Hi John, Josh wants you to pay $50.00 to US Relief Fund. Do you confirm?"

The wearer of smartwatch 302 may select yes, shown at 310. Selecting yes may confirm the transaction. The yes selection may be transmitted back to the financial institution. The yes selection may trigger the financial institution to approve the transaction. Once the financial institution approves the transaction, the financial institution may notify both the transaction-initiating smartwatch and the device associated with the card holder, such as smartwatch 302, that the transaction was approved and processed.

The wearer of smartwatch 302 may select no, shown at 312. Selecting no may deny the transaction. The no selection may be transmitted back to the financial institution. The no selection may trigger the financial institution to deny the transaction. Once the financial institution denies the transaction, the financial institution may notify both the transaction-initiating smartwatch and the device associated with the card holder, such as smartwatch 302, that the transaction was denied.

Figure 4:
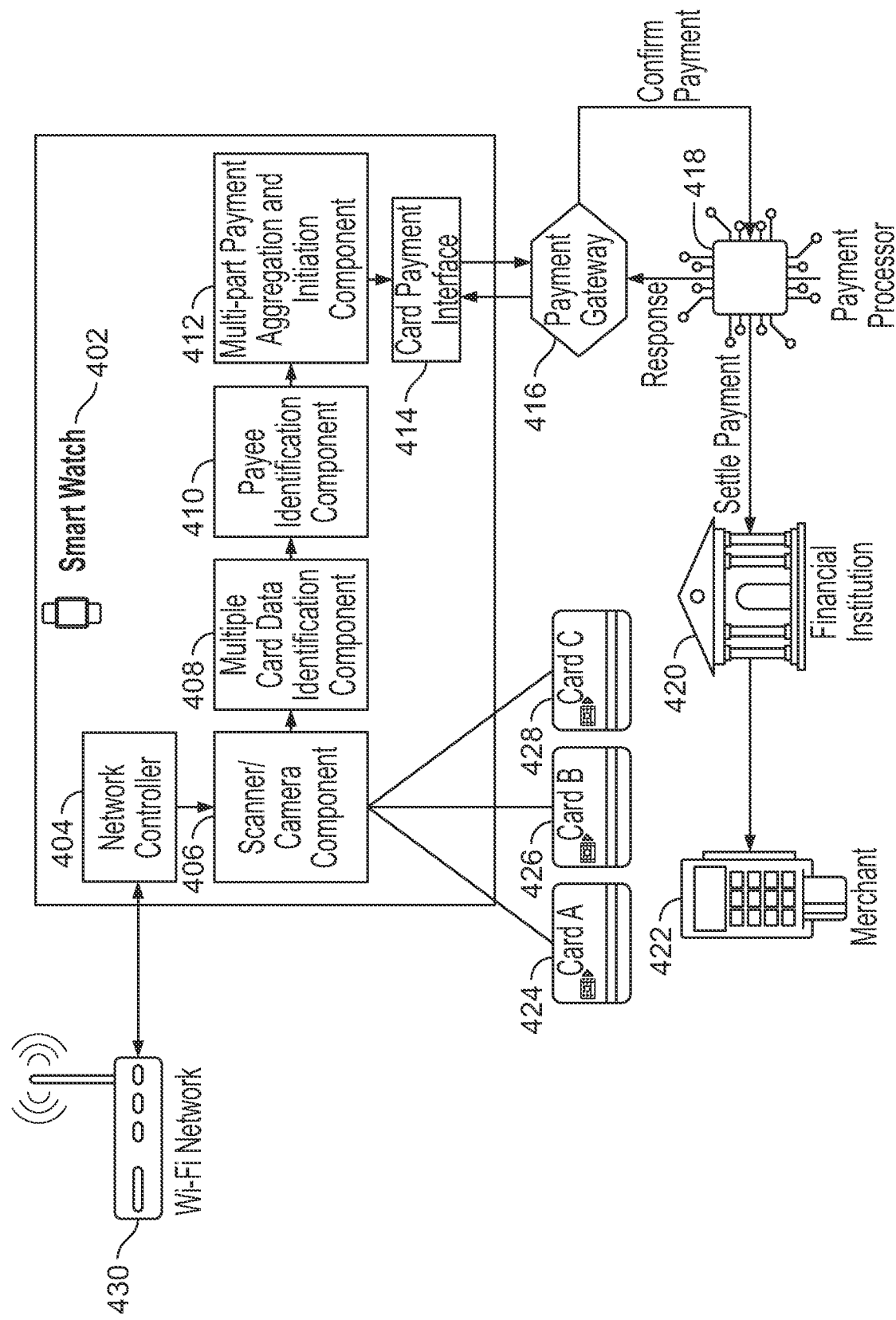
FIG. 4 shows an illustrative flow diagram in accordance with principles of the disclosure.

FIG. 4 shows an illustrative diagram. Smartwatch 402 may include various components. Smartwatch 402 may include network controller 404. Network controller 404 may communicate with Wi-Fi Network 430. Network controller 404 may provide wireless connectivity to smartwatch 402. Network controller 404 may interface between Wi-Fi network 430 and scanner/camera component 406.

Scanner/camera component 406 may capture scans of card A, shown at 424, card B, shown at 426 and card C, shown at 428. Smartwatch 402 may include multiple card data identification component 408. Multiple card data identification component 408 may retrieve card data from the multiple scanned cards.

Smartwatch 402 may also include payee identification component 410. Payee identification component 410 may identify a payee of the transaction. The payee identification data may be received from an external source. Such an external source may be data entered into the smartwatch. Such an external source may be a quick response ("QR") code captured at smartwatch 402. The QR code may include payee account data. The payee may be merchant 422.

The payee identification data may be retrieved from an internal source. The internal source may be a memory location included in smartwatch 402. In some embodiments, the payee account data may be associated with smartwatch 402. As such, the payee of the transaction may be the wearer of smartwatch 402.

Once the payee account data is received, multi-part payment aggregation and initiation component 412 may aggregate the card data, associated with cards A, B and C and the payee data into an aggregated transaction payload. Card payment interface 414 may transmit the aggregated transaction payload to payment gateway 416. Payment gateway 416 may be external to smartwatch 402.

Payment gateway 416 may transmit the transaction to payment processor 418 for transaction confirmation. Payment processor 418 may settle the payment with financial institution 420. Financial institution 420 may approve or deny the transaction. It should be appreciated that, in some embodiments, payment processor 418 may communicate with multiple financial institutions. Each of the multiple financial institutions may be a card issuer.

Once payment processor 418 settles the payment with financial institution 420, payment processor 418 may transmit a response to payment gateway 416. The response may include an approval or denial of the transaction. Payment gateway 416 may transmit the response, either approval or denial, to card payment interface 414.

In the event that merchant 422 is the payee of the transaction, financial institution 420 may remit funds to merchant 422.

Figure 5:
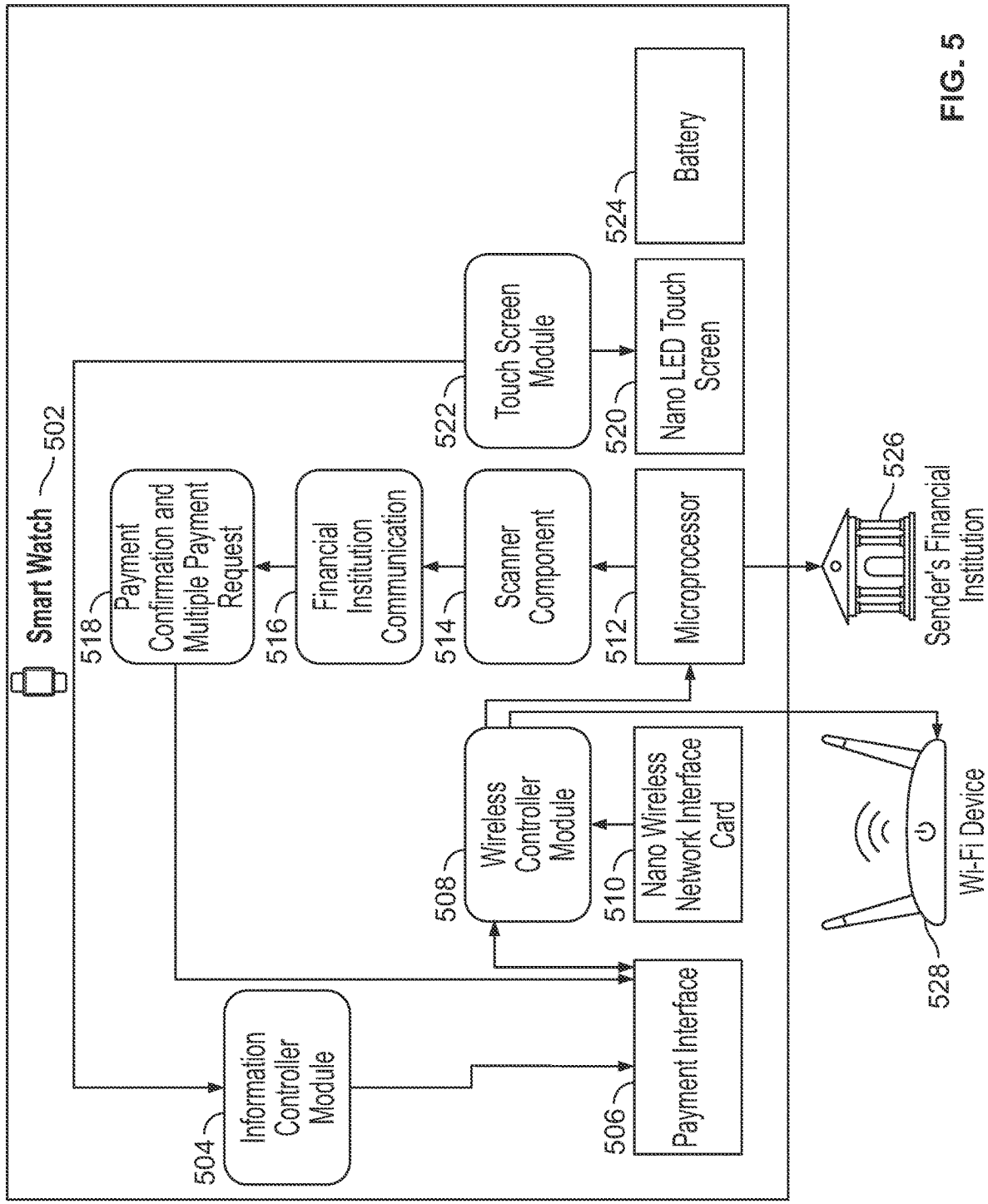
FIG. 5 shows another illustrative flow diagram in accordance with principles of the disclosure.

FIG. 5 shows an illustrative diagram. Smartwatch 502 may include multiple hardware and software components. Smartwatch 502 hardware components may include payment interface 502, nano wireless network interface card 510, microprocessor 512, nano LED touch screen 520 and battery 524.

Smartwatch 502 software components may include information controller 504, wireless controller module 508, scanner component 514, financial institution communication 516, payment confirmation and multiple payment request 518 and touch screen module 522.

Battery 524 may power the various hardware and software components of smartwatch 502. Microprocessor 512 may provide processing power to the various hardware and software components of smartwatch 502.

Scanner component 514 may scan one or more cards. Scanner component 514 may include, or interface with, one or more cameras or scanning devices. Once the cards are scanned and the card data is retrieved from the cards, financial institution communication 516 may communicate with one or more financial institutions associated with the scanned cards. The communication with the financial institutions may be to retrieve account data associated with each of the cards.

Payment confirmation and multiple payment request 518 may combine the account data received from the financial institutions, transaction amounts received via user input and payee data received via an internal source or an external source into an aggregated transaction payload. Payment confirmation and multiple payment request 518 may receive the user inputted data, such as the transaction amounts, from payment interface 506, via information controller module 504, touch screen module 522 and nano LED touch screen 502.

Nano LED touch screen 520 may receive touch-based user input. Touch screen module 522 may be software that interfaces with nano LED touch screen to determine user inputs. Information controller module 504 may categorize the user inputs as transaction amounts, payee data or any other suitable user inputs. Information controller module 504 may transmit the categorized data to payment interface 506.

At times, payment interface 506 may transmit the user input data received from information controller module to payment confirmation and multiple payment request 518. As such, payment confirmation and multiple payment request 518 may update the aggregated transaction payload with the received user input. Once the aggregated transaction is uploaded, payment confirmation and multiple payment request 518 may transmit the aggregated transaction payload to payment interface 506.

Other times, payment interface may combine the aggregated transaction payload received from payment confirmation and multiple request 518 with the data received from information controller module 504.

Payment interface 506 may communicate with wireless controller module. Wireless controller module may interface between nano wireless network interface card 510 and external Wi-Fi device 528 to provide wireless connectivity to smartwatch 502. Wireless controller module 508 may communicate the aggregated transaction payload from payment interface 506 to microprocessor 512. Microprocessor 512 may transmit the aggregated transaction payload to the sender's financial institution 526 for processing. Sender's financial institution may be a card issuer of a captured card.

Figure 6:
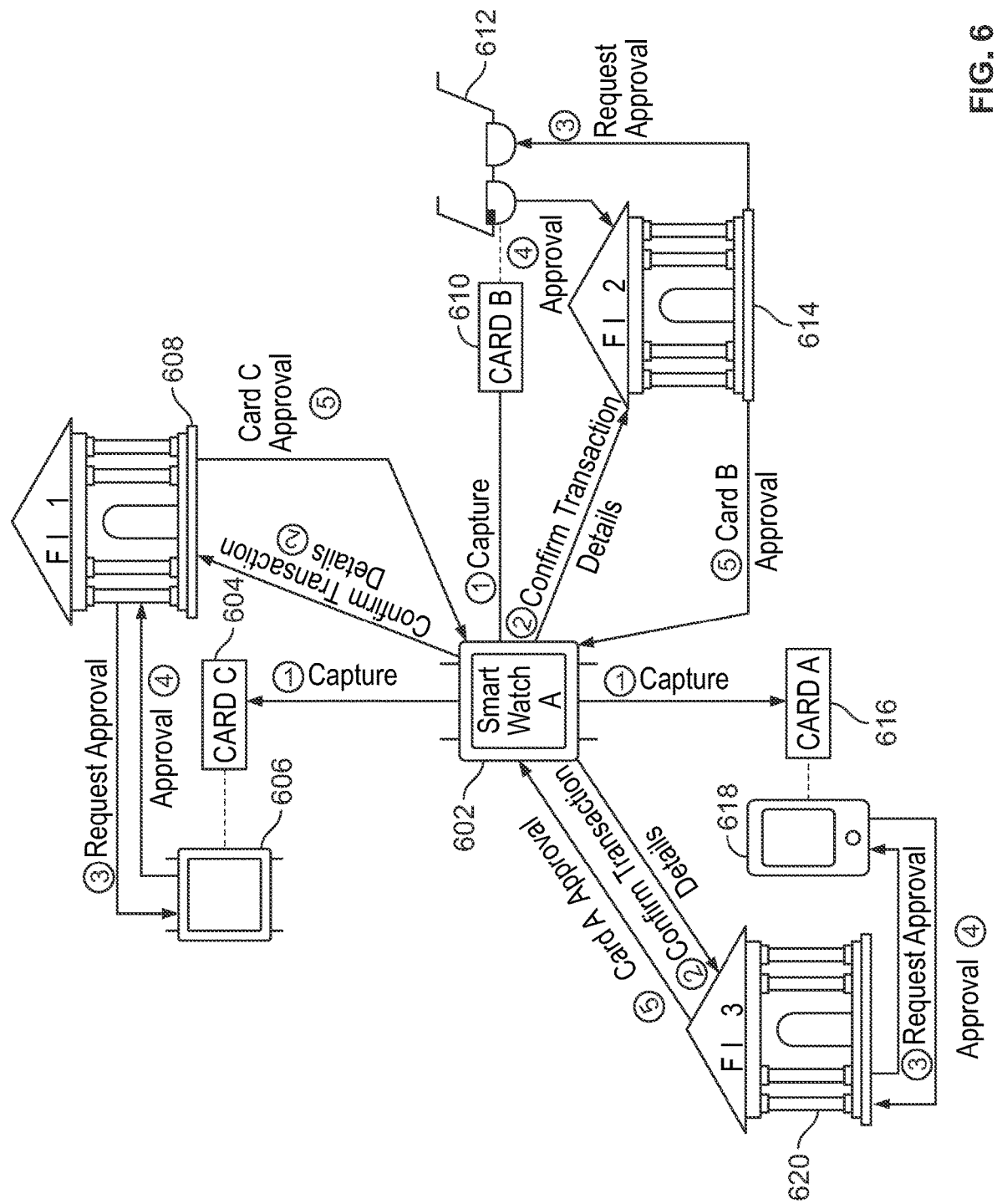
FIG. 6 shows yet another illustrative flow diagram in accordance with principles of the disclosure.

FIG. 6 shows an illustrative flow diagram. A smartwatch may capture a plurality of cards in order to process a transaction. The plurality of cards may be used together to purchase an item, service or for any other suitable purpose. At times, each of the plurality of cards may contribute an equal share of funds for the purchase. At other times, each of the plurality of cards may contribute a non-equal share of funds.

Smartwatch A, shown at 602, may capture card data from card A, shown at 616, card B, shown at 610 and card C, shown at 604, as indicated at step 1. Smartwatch A may utilize a scanning component to capture card data from card A, B and C. Cards A, B and C may be payment cards. The scanning component may be a camera, magnetic scanning device or any other suitable scanning component.

Once smartwatch A captures card data from a card, smartwatch A may identify a financial institution associated with the card. At times, the financial institution may be included in the card data. Other times, the financial institution may be indicated in the card data. For example, the first six digits of a card number may be an issuer identification number ("IIN"). The IIN may identify a financial institution that issued the card. Smartwatch A may be able to communicate with a public listing on a network, such as the Internet, to determine a process for accessing the issuer identified by the IIN.

The first digit of the IIN may be a major industry identifier ("MII"). The MII may indicate the industry associated with the issuer.

Smartwatch A may identify financial institution 3, shown at 620, as associated with card A. Smartwatch A may identify financial institution 2, as associated with card B. Smartwatch A may also identify financial institution 1, as associated with card C.

Once smartwatch A identifies a financial institution associated with card A, card B and card C, smartwatch A may communicate with each identified financial institution. The initial communication between smartwatch A and financial institution 1, shown at 608, financial institution 2, shown at 614 and financial institution 3, shown at 620 may be to confirm transaction details, as indicated at step 2.

In order to confirm the transaction details, each financial institution may communicate with, and request approval from, a device associated with the captured card, as shown at step 3. It should be appreciated that the captured card data may include a device identifier. As such, financial institution 1, shown at 608, may communicate with, and request approval from, smartwatch 606. Smartwatch 606 may be associated with card C. Financial institution 2, shown at 614 may communicate with, and request approval from, smartglasses 612. Smartglasses 606 may be associated with card B. Financial institution 3 may communicate with, and request approval from, mobile device 618. Mobile device 618 may be associated with card A.

In certain embodiments, prior to communicating with the associated device, each financial institution may execute an account verification. As such, if the account verification fails, the financial institution may communicate the failure to smartwatch A. In such embodiments, the financial institution may not communicate with the device associated with the card.

A user of mobile device 618 may approve the transaction details at mobile device 618. A user of smartglasses 612 may approve the transaction details at smartglasses 612. A user of smartwatch 606 may approve the transaction details at smartwatch 606. The approval may be submitted by selecting an approval button or any other suitable approval entry process.

Upon receipt of an approval at mobile device 618, an approval notification may be transmitted to financial institution 3, as shown at step 4. Upon receipt of an approval at smartglasses 612, an approval notification may be transmitted to financial institution 2, as shown at step 4. Upon receipt of an approval at smartwatch 606, an approval notification may be transmitted to financial institution 1.

Financial institutions 1, 2 and 3 may forward the received approval notifications to smartwatch A, as shown at step 5.

Once smartwatch A receives the approval notifications from financial institutions A, B and C, smartwatch A may forward the transaction, including the card data elements and the received approval, to a processing entity. The processing entity may be one of financial institutions 1, 2 or 3. The processing entity may be any other suitable processing entity. The processing entity may process the transaction. The processing entity may communicate a transaction-processed notification to smartwatch A. The processing entity may communicate a transaction-processed notification to any other suitable device or entity such as smartwatch 606, smartglasses 612, mobile device 618, financial institution 1, financial institution 2 and/or financial institution 3.

Thus, integrated scan money transfer technology systems are provided. Persons skilled in the art will appreciate that the present invention can be practiced by other than the described embodiments, which are presented for purposes of illustration rather than of limitation. The present invention is limited only by the claims that follow.

What is claimed is:

1. A smartwatch device comprising:
   a plurality of hardware components; and
   a plurality of software components;
   the plurality of hardware components comprising:
   a microprocessor, the microprocessor operable to provide processing capabilities to the plurality of hardware components and the plurality of software components;
   a nano light emitting diode ("LED") touch screen, the nano LED touch screen operable to:
   display a plurality of software displays as instructed by the microprocessor; and
   capture user input;
   a scanner, the scanner operable to capture a plurality of card photographs, said plurality of card photographs relating to a plurality of payment cards;
   a nano wireless network interface card;

a battery, the battery operable to power the microprocessor, the nano LED touch screen, the scanner and the nano wireless network interface card;

the plurality of software components operable to:
identify a set of card data elements from each captured card photograph included in the plurality of card photographs, each set of card data elements relating to a card included in the plurality of payment cards;
capture a user-inputted transaction amount for each of the plurality of payment cards, via a software display displayed on the nano LED touch screen, said software display included in the plurality of software displays;
for each card included in the plurality of payment cards, link the transaction amount to the set of card data elements;
for each card included in the plurality of payment cards, transmit the transaction amount to an external card entity associated with the card, the external card entity being identified in the set of card data elements;
for each card included in the plurality of payment cards, receive an approval signal from the external card entity;
upon receipt of the approval signal from each external card entity, aggregate each set of card data elements linked to the transaction amount into an aggregated transaction payload;
identify a plurality of payee data elements;
interface between the nano wireless network interface card and an external Wi-Fi device to provide wireless connectivity to the smartwatch device; and
receive, at a payment interface included in the plurality of software components, wireless connectivity;
receive, at the payment interface, processing capabilities from the microprocessor;
receive, at the payment interface, the aggregated transaction payload;
receive, at the payment interface, the payee data elements;
append, at the payment interface, the payee data elements to the aggregated transaction payload;
transmit, at the payment interface, the aggregated transaction payload to an external entity; and
receive, at the payment interface, a confirmation from the external entity.

2. The smartwatch device of claim 1, wherein, prior to receiving the approval signal, the external card entity requests and receives approval from a device identified within the card data elements.

3. The smartwatch device of claim 2, wherein the device identified within the set card data elements is a second smartwatch, a mobile device or a smartglasses device.

4. The smartwatch device of claim 1, wherein the plurality of payee data elements are identified upon aggregating each set of card data elements linked to the transaction amount into the aggregated transaction payload.

5. A smartwatch device comprising:
a plurality of hardware components; and
a plurality of software components;
the plurality of hardware components comprising:
a microprocessor, the microprocessor operable to provide processing capabilities to the plurality of hardware components and the plurality of software components;
a nano light emitting diode ("LED") touch screen, the nano LED touch screen operable to:
display a plurality of software displays as instructed by the microprocessor; and
receive user input;
a scanner, the scanner operable to capture a plurality of card photographs, said plurality of card photographs relating to a plurality of payment cards;
a nano wireless network interface card;
a battery, the battery operable to power the microprocessor, the nano LED touch screen, the scanner and the nano wireless network interface card;
the plurality of software components operable to:
identify a set of card data elements from each captured card photograph included in the plurality of card photographs, each set of card data elements relating to a card included in the plurality of payment cards;
capture a user-inputted transaction amount for each of the plurality of payment cards, via a software display displayed on the nano LED touch screen, said software display included in the plurality of software displays;
for each card included in the plurality of payment cards, link the transaction amount to the set of card data elements;
for each card included in the plurality of payment cards, transmit the set of card data elements to an external card entity associated with the card, the external card entity being identified in the set of card data elements;
for each card included in the plurality of payment cards, receive an account number from the external card entity;
upon receipt of the account number from each external card entity, aggregate each set of card data elements linked to the transaction amount and the account number into an aggregated transaction payload;
identify one or more payee data elements;
interface between the nano wireless network interface card and an external Wi-Fi device to provide wireless connectivity to the smartwatch device;
receive, at a payment interface included in the plurality of software components, wireless connectivity;
receive, at the payment interface, processing capabilities from the microprocessor;
receive, at the payment interface, the aggregated transaction payload and the one or more payee data elements;
transmit, at the payment interface, the aggregated transaction payload and the one or more payee data elements to an external entity; and
receive, at the payment interface a confirmation from the external entity.

6. The smartwatch device of claim 5, wherein, prior to receiving the account number, each external card entity requests and receives approval from a device identified within the set of card data elements.

7. The smartwatch device of claim 6, wherein each request for approval comprises approval of the transaction amount.

8. The smartwatch device of claim 6, wherein the device identified within the set of card data elements is a second smartwatch, a mobile device or a smartglasses device.

9. The smartwatch device of claim 5, wherein the one or more payee data elements are identified upon conclusion of the aggregation of each set of card data elements linked to the transaction amount and the account number into the aggregated transaction payload.

10. The smartwatch device of claim 5, wherein the one or more payee data elements include a payee email address.

11. The smartwatch device of claim 5, wherein the one or more payee data elements include a payee telephone number.

* * * * *